United States Patent
Greenhut et al.

(10) Patent No.: US 9,820,114 B2
(45) Date of Patent: Nov. 14, 2017

(54) SYSTEM AND METHOD FOR TESTING BLOOD ALCOHOL LEVEL AND TRANSMITTING THE RESULTS USING A MOBILE DEVICE

(71) Applicants: Jessica Greenhut, Dix Hills, NY (US); Samantha Greenhut, Dix Hills, NY (US)

(72) Inventors: Jessica Greenhut, Dix Hills, NY (US); Samantha Greenhut, Dix Hills, NY (US)

(*) Notice: Subject to any disclaimer, the term of this patent is extended or adjusted under 35 U.S.C. 154(b) by 0 days.

(21) Appl. No.: 14/707,219

(22) Filed: May 8, 2015

(65) Prior Publication Data

US 2015/0325104 A1    Nov. 12, 2015

Related U.S. Application Data

(60) Provisional application No. 61/991,108, filed on May 9, 2014.

(51) Int. Cl.

| | |
|---|---|
| *G08B 23/00* | (2006.01) |
| *H04W 4/12* | (2009.01) |
| *G08B 27/00* | (2006.01) |
| *B60W 40/08* | (2012.01) |
| *G08B 21/04* | (2006.01) |

(52) U.S. Cl.
CPC ............. *H04W 4/12* (2013.01); *B60W 40/08* (2013.01); *G08B 21/0461* (2013.01); *G08B 27/006* (2013.01); *B60W 2040/0836* (2013.01)

(58) Field of Classification Search
CPC ............. H04W 4/14; B60W 40/08; B60W 2040/0836; G08B 21/0461; G08B 27/006

USPC .............................................. 340/576
See application file for complete search history.

(56) References Cited

U.S. PATENT DOCUMENTS

| | | | | |
|---|---|---|---|---|
| 2007/0239992 | A1* | 10/2007 | White ................. | B60K 28/063 713/186 |
| 2010/0012417 | A1* | 1/2010 | Walter ................. | B60K 28/063 180/272 |
| 2012/0112879 | A1* | 5/2012 | Ekchian ................ | A61B 5/117 340/5.53 |
| 2013/0150004 | A1* | 6/2013 | Rosen .................... | H04W 8/22 455/414.1 |
| 2014/0079192 | A1* | 3/2014 | Amerling ............. | H04M 3/5116 379/45 |
| 2014/0216136 | A1* | 8/2014 | Yim .................... | G01N 33/4972 73/31.05 |
| 2014/0279707 | A1* | 9/2014 | Joshua ............... | G06Q 30/0283 705/400 |

(Continued)

Primary Examiner — Zhen Y Wu
(74) Attorney, Agent, or Firm — Tutunjian & Bitetto, P.C.

(57) ABSTRACT

Systems and methods for testing blood alcohol level and transmitting results using a mobile device, including attaching a breathalyzer device to the mobile device, wherein the breathalyzer device is configured to transmit data to the mobile device. Blood alcohol level of a user is tested using the breathalyzer device, and an alert is sent to one or more contacts if the blood alcohol level of the user is above a pre-determined level. A response is received from a contact indicating that the responding contact is able to assist the user, all non-responding contacts are notified that the responding contact will assist the user; and all non-responding pre-determined contacts are notified when the responding pre-determined contact has arrived to assist the user.

16 Claims, 4 Drawing Sheets

(56) References Cited

U.S. PATENT DOCUMENTS

| | | | | |
|---|---|---|---|---|
| 2014/0281523 | A1* | 9/2014 | Golino | H04L 63/0428 |
| | | | | 713/168 |
| 2015/0066284 | A1* | 3/2015 | Yopp | B60W 30/00 |
| | | | | 701/29.2 |
| 2015/0130611 | A1* | 5/2015 | Roth | G07C 9/00111 |
| | | | | 340/539.11 |
| 2015/0178312 | A1* | 6/2015 | Pant | G06F 17/30241 |
| | | | | 707/722 |
| 2015/0204844 | A1* | 7/2015 | Nothacker | G01N 33/4972 |
| | | | | 73/23.3 |
| 2015/0279199 | A1* | 10/2015 | Yarkoni | G08B 25/016 |
| | | | | 340/539.11 |

* cited by examiner

SYSTEM AND METHOD FOR TESTING BLOOD ALCOHOL LEVEL AND TRANSMITTING THE RESULTS USING A MOBILE DEVICE

RELATED APPLICATION INFORMATION

This application claims priority to provisional application Ser. No. 61/991,108 filed on May 9, 2014, incorporated herein by reference in its entirety.

BACKGROUND

Technical Field

The present invention relates to testing of blood alcohol level of a user and/or requesting of assistance by a user, and more particularly to testing of blood alcohol level and transmitting results automatically, and/or requesting of assistance by a user for any of a plurality of reasons using a mobile device.

Description of the Related Art

Systems currently exist for testing blood alcohol level (BAL) of a user using a device which attaches to a smartphone or other mobile device. However, there exists a need for, and there is currently no system or method which employs a mobile breathalyzer device to measure a user's BAL, and connects to a buddy list or other pre-determined contacts which receive a report of the results of the breathalyzer test, and/or alerts buddies and/or contacts that the user is unable to drive and needs someone to pick them up to get them home safely.

SUMMARY

A system and method for testing of blood alcohol level of a user, and more particularly to testing of blood alcohol level and transmitting results automatically using a mobile device. Driving while intoxicated (DWI) is an activity that has become a problem in today's society, and the system and method according to the present principles may be employed to help to prevent DWI. The system and method according to the present principles may employ a verification mechanism (e.g., camera) in conjunction with a buddy list (e.g., BOOZINGA buddy list, Facebook™ friend list, etc.) and/or other pre-determined contacts who may receive a report of the results of the breathalyzer test, and/or alerts buddies and/or contacts that the user is unable to drive and/or needs assistance for any reason, and needs someone to pick them up to assist in bringing the user safely to their destination.

A method for testing blood alcohol level and transmitting results using a mobile device, including attaching a breathalyzer device to the mobile device, wherein the breathalyzer device is configured to transmit data to the mobile device; testing a blood alcohol level of a user using the breathalyzer device; sending an alert to one or more pre-determined contacts if the blood alcohol level of the user is above a pre-determined level; receiving a response from one or more pre-determined contact indicating that a responding predetermined contact is able to assist the user; notifying all non-responding pre-determined contacts that the responding pre-determined contact will assist the user; and notifying all non-responding pre-determined contacts when the responding pre-determined contact has arrived to assist the user.

A system for testing blood alcohol level and transmitting results using a mobile device, including a breathalyzer device attached to the mobile device, wherein the breathalyzer device is configured to test a blood alcohol level of a user, and to transmit data to the mobile device; an alert module configured to send an alert to one or more pre-determined contacts if the blood alcohol level of the user is above a pre-determined level; a response receiving module configured to receive a response from one or more pre-determined contacts indicating that the responding pre-determined contact is able to assist the user; and a notification module configured to notify all non-responding pre-determined contacts that the responding pre-determined contact will assist the user, and when the responding pre-determined contact has arrived to assist the user.

A method for requesting assistance from pre-determined contacts by a user using a mobile device, including sending an alert to pre-determined contacts if the user determines that assistance is needed for one or more of a plurality of reasons; receiving a response from a pre-determined contact indicating that the predetermined contact is able to assist the user; notifying all non-responding pre-determined contacts that the responding pre-determined contact will assist the user; and notifying all non-responding pre-determined contacts when the responding pre-determined contact has arrived to assist the user These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
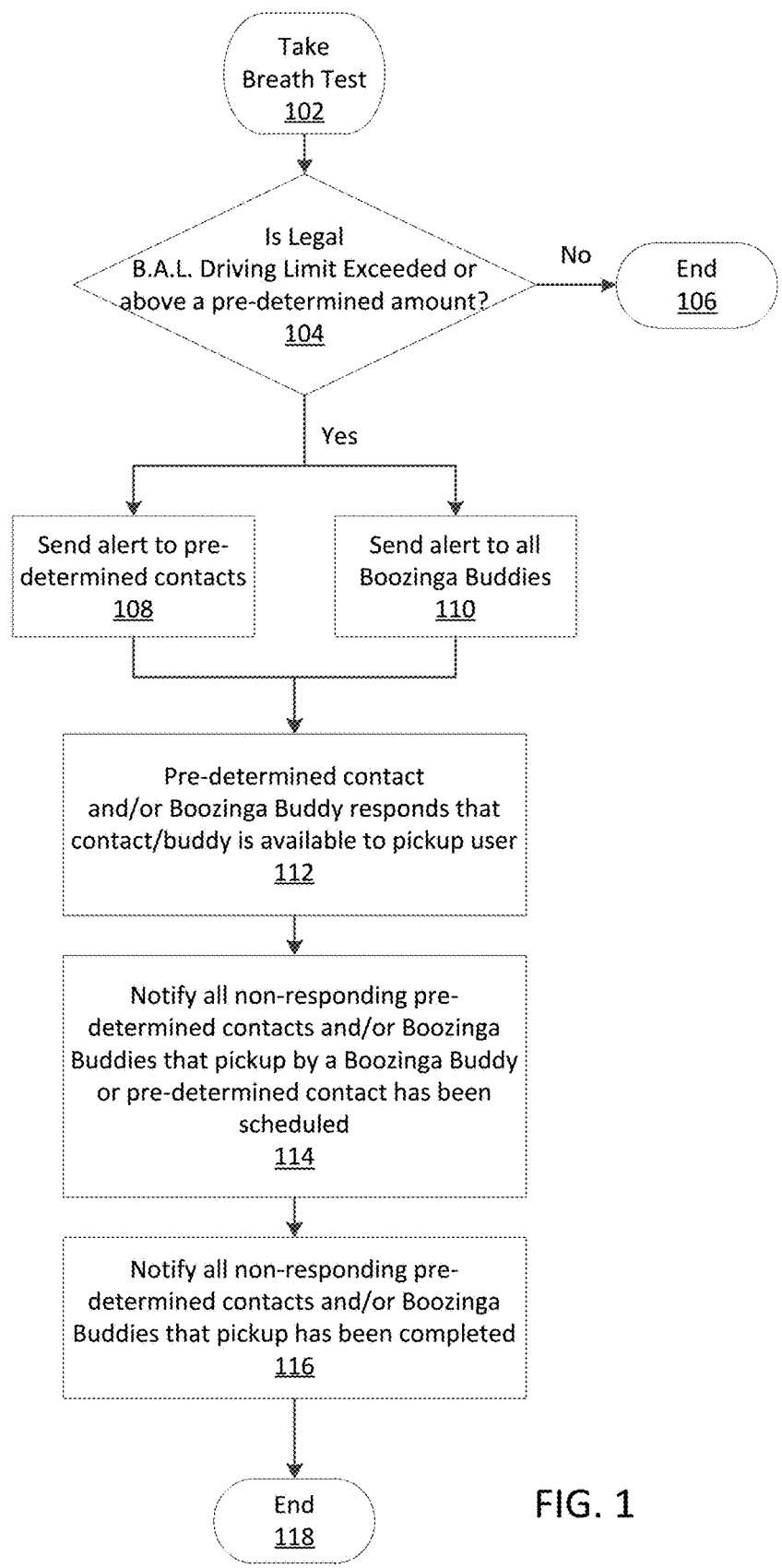
FIG. 1 is a block/flow diagram showing a system and method for testing of blood alcohol level and transmitting results automatically using a mobile device in accordance with an illustrative embodiment.

The present principles may employ a verification mechanism (e.g., camera) in conjunction with a buddy list (e.g., BOOZINGA buddy list, Facebook™ friend list, etc.) and/or other pre-determined contacts who may receive a report of the results of the breathalyzer test, and/or alerts buddies and/or contacts that the user is unable to drive, and/or needs assistance for any reason, and needs someone to pick them up to assist in bringing the user safely to their destination.

In one embodiment, a mobile device (e.g., smartphone, tablet, etc.) may be employed to detect the blood alcohol level (BAL) of a user by attaching a breathalyzer device according to the present principles (hereinafter BOOZINGA breathalyzer device) to the mobile device. It is noted that although the system and method advantageously employs the BOOZINGA device as a breathalyzer, it is contemplated that other breathalyzers attachable to a mobile device may also be employed according to the present principles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer/mobile device, partly on the user's computer/mobile device, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, mobile device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a system and method for testing of blood alcohol level and transmitting results automatically using a mobile device is illustratively depicted according to one embodiment of the present principles.

In one embodiment, a user may attach a breathalyzer device (e.g., BOOZINGA breathalyzer device) to a mobile device (e.g., smartphone, tablet, etc.), and blow into breathalyzer device to take a breath test in block 102, and a front facing camera on a mobile device may be employed to take a video of a user while taking the breath test. The system may then determine whether the legal BAL driving limit is exceeded, or may determine whether a pre-set limit of any BAL amount is exceeded in block 104, and video alerts may be sent to buddies from a buddy list (e.g., BOOZINGA buddy list, Facebook™ friend list, etc.) if the user's BAL is above a pre-set limit (e.g., parental limit, legal driving limit, etc.). If the legal limit, or pre-set limit is not exceeded, the process ends in block 106. If the legal BAL driving limit, or a pre-set limit of any BAL amount is exceeded, an alert may be sent to pre-determined contacts in block 108, or to BOOZINGA buddies from a pre-set BOOZINGA buddy list in block 110. A BOOZINGA buddy list may be generated by adding other BOOZINGA users to a user's BOOZINGA buddy list.

In one embodiment, the system and method according to the present principles may employ location services in a mobile device to determine and display a plurality of pieces of information regarding BOOZINGA buddies including, but not limited to, when buddies are available to assist, buddies' distance from the user's location, etc. The present principles may also be employed to use the location services to determine and display available alternate means of transportation, including but not limited to taxis, trains, buses, etc.

A pre-determined contact and/or buddy buddies from a buddy list (e.g., BOOZINGA buddy, Facebook™ friend, etc.) may respond that that they are available to pickup the user using the BOOZINGA application on their own mobile device or computer in block 112, and the BOOZINGA application may then notify all non-responding pre-determined contacts and/or BOOZINGA buddies that pickup by a BOOZINGA buddy has been scheduled in block 114. The pre-determined contacts and/or BOOZINGA buddies may also view the distance from their present location that the BOOZINGA user is located. Next, the BOOZINGA application may notify all non-responding pre-determined contacts and/or BOOZINGA buddies that pickup has been completed once the user has been picked up in block 116, and the application may then end in block 118.

Figure 2:
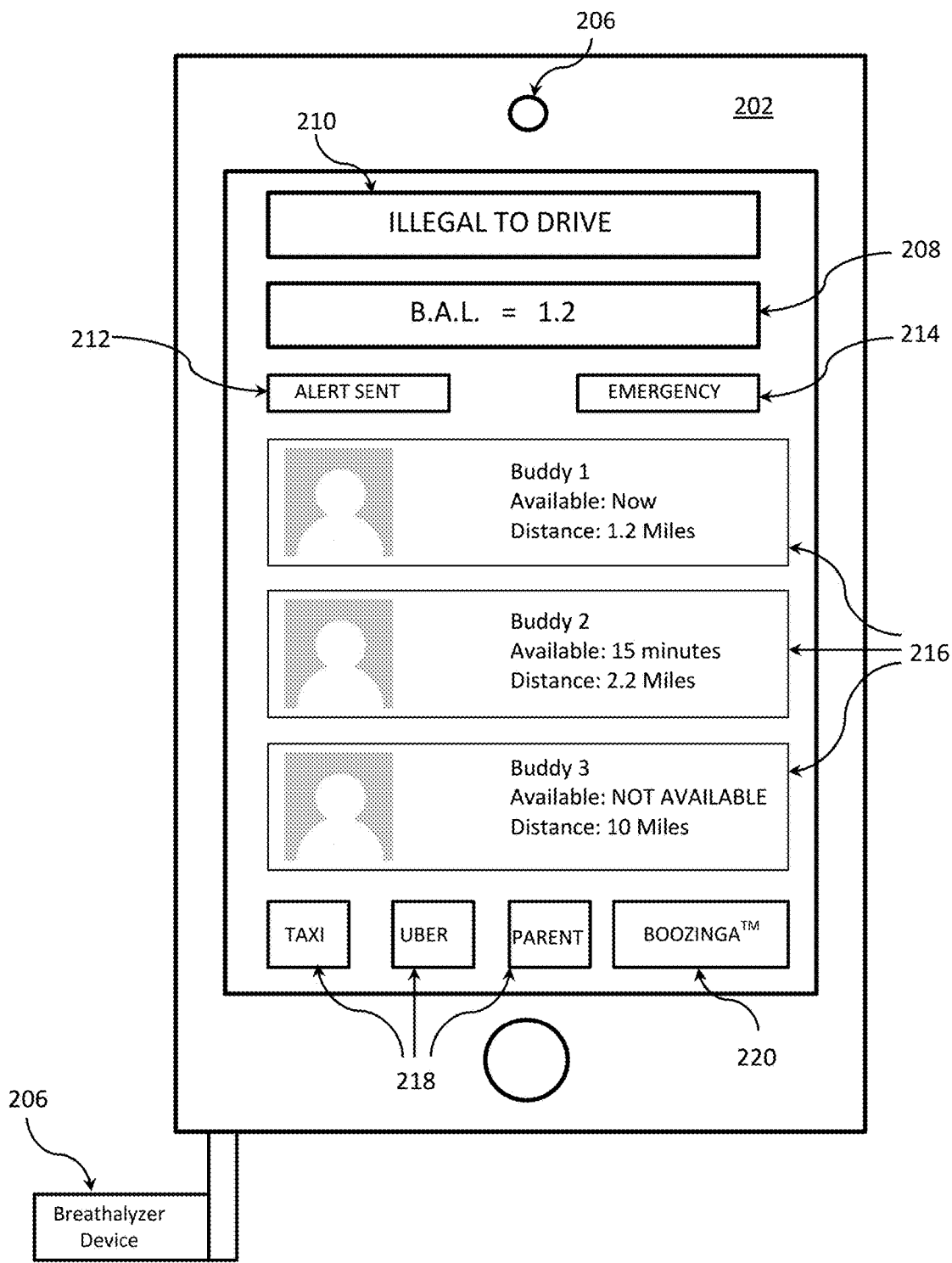
FIG. 2 is a block/flow diagram showing a system architecture and method for testing of blood alcohol level and transmitting results automatically using a mobile device in accordance with an illustrative embodiment.

Referring now to FIG. 2, a system architecture and method for testing of blood alcohol level (BAL) and transmitting results automatically using a mobile device 200 is illustratively depicted in accordance with one embodiment according to the present principles. In one embodiment, a mobile phone 202 including an application to test the BAL of a user and transmit results automatically (hereinafter "BOOZINGA application") is employed, and a breathalyzer (e.g., BOOZINGA Breathalyzer) 204 may be attached to the mobile phone to blow into for the breath test. A verification mechanism (e.g., front facing camera) 206 may be employed to record and/or transmit a picture/video of the breath test to buddies and/or predetermined contacts so that it is verified that the person taking the breathalyzer test is the user. This feature is especially advantageous for parents who want to make sure that their children are not consuming alcohol, members of Alcoholics Anonymous, Parole Officers who want to verify that parolees are not drinking heavily, etc.

In one embodiment, the mobile device display may include a plurality of notification windows, including a BAL notification window 208, a window that displays whether it is legal to drive or illegal to drive in the jurisdiction in which the user is currently located 210, a window that displays that an alert has been sent to BOOZINGA buddies and/or pre-determined contacts 212, a window that displays whether an emergency situation is occurring, windows displaying BOOZINGA buddies and/or pre-determined contacts, their availability time and distance from the BOOZINGA user 216, and windows displaying alternate means of transportation for communication (e.g., taxi, uber, parent, etc) 218. It is noted that the pre-determined contacts may also be selected from social media contacts in one embodiment, and a BOOZINGA button 220 may be employed on the screen of the mobile device to send an alert to buddies and/or pre-determined contacts for any of a plurality of reasons. In one embodiment, any means of communication or connectivity (e.g., Wi-Fi™, Bluetooth™, AirDrop™, etc.) may be employed to communicate between a user and buddies, pre-determined contacts and/or alternate means of transportation for communication. It is further noted that although the above screen configuration is illustratively depicted, it is contemplated that other sorts of configurations may also be employed according to the present principles.

It should be understood that the example described herein for a system and method for testing blood alcohol level and transmitting results using the BOOZINGA application installed on a mobile device coupled with the BOOZINGA breathalyzer device, is merely illustrative, and that the present principles are applicable to any breathalyzer device which may be attached to a mobile device of any kind.

Figure 3:
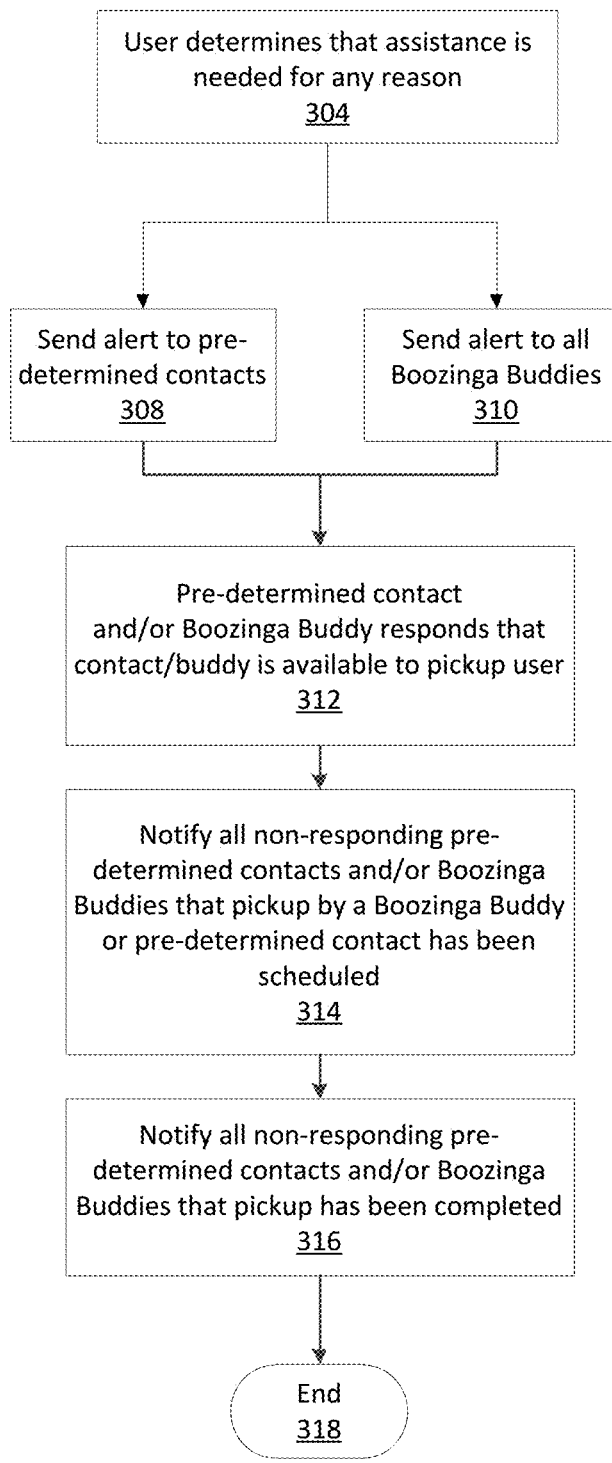
FIG. 3 is a block/flow diagram showing a system and method for requesting assistance from pre-determined contacts or buddies from a buddy list in accordance with an illustrative embodiment.

Referring now to FIG. 3, a system and method for requesting assistance from pre-determined contacts or BOOZINGA buddies is illustratively depicted according to one embodiment of the present principles. In one embodiment, the user may send a request for assistance for any or a plurality of reasons (e.g., drunk, on drugs, scared, injured, etc.) in block 304, and video alerts may be sent to pre-determined contacts or BOOZINGA buddies in blocks 308 and 310, respectively. A text, or other type of alert may also be sent to pre-determined contacts in block 308, or to BOOZINGA buddies from a pre-set BOOZINGA buddy list in block 310. A BOOZINGA buddy list may be generated by adding other BOOZINGA users to a user's BOOZINGA buddy list.

In one embodiment, the system and method according to the present principles may employ location services in a mobile device to determine and display a plurality of pieces of information regarding BOOZINGA buddies including, but not limited to, when buddies are available to assist, buddies' distance from the user's location, etc. The present principles may also be employed to use the location services to determine and display available alternate means of transportation, including but not limited to taxis, trains, buses, etc.

A pre-determined contact and/or BOOZINGA buddy may respond that that they are available to pickup the user using the BOOZINGA application on their own mobile device or computer in block 312, and the BOOZINGA application may then notify all non-responding pre-determined contacts and/or BOOZINGA buddies that pickup by a BOOZINGA buddy has been scheduled in block 314. The pre-determined contacts and/or BOOZINGA buddies may also view the distance from their present location that the BOOZINGA user is located. Next, the BOOZINGA application may notify all non-responding pre-determined contacts and/or BOOZINGA buddies that pickup has been completed once the user has been picked up in block 316, and the application may then end in block 318.

Figure 4:
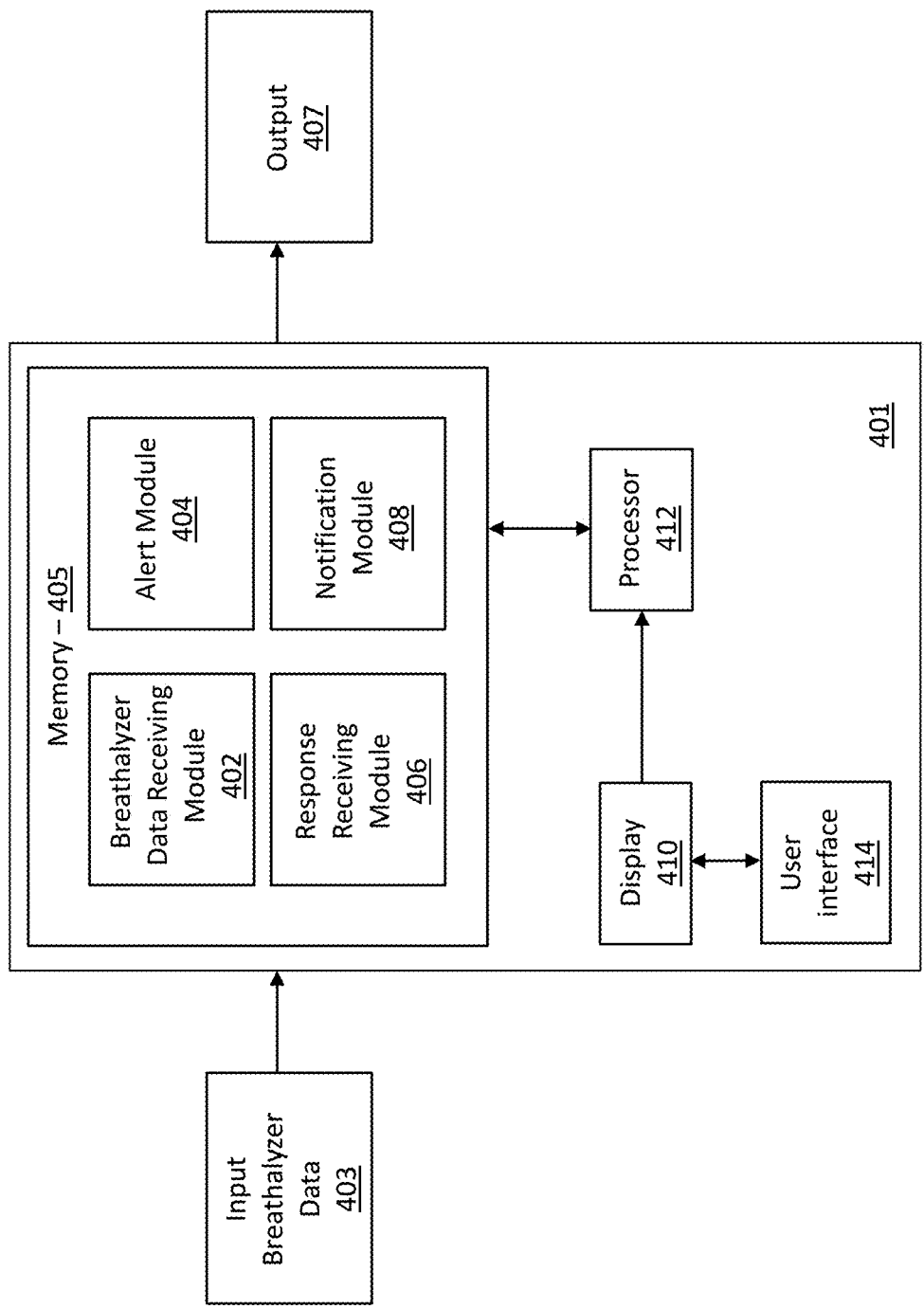
FIG. 4 is a block/flow diagram showing a system architecture and method for testing of blood alcohol level and transmitting results automatically using a computing device in accordance with an illustrative embodiment.

Referring now to FIG. 4, a system for testing of blood alcohol level and transmitting results automatically using a special purpose computing device 401 is illustratively depicted in accordance with one embodiment according to the present principles.

In one embodiment, the system 401 may include a workstation, mobile device, computing device, etc. 401. The system 401 may be a general purpose, or special purpose computer, and preferably includes one or more processors and/or coprocessors 412 and memory 405 for storing applications, modules, and other data. In one embodiment, the system 401 may include one or more displays 410 for viewing. The displays 410 may permit a user to interact with the system 401 and its components and functions. This may be further facilitated by a user interface 414, which may include a mouse, joystick, touchscreen, or any other peripheral or control to permit user interaction with the system 401 and/or its devices. It should be understood that the components and functions of the system 401 may be integrated into one or more systems, workstations, mobile devices, or other computing devices.

In one embodiment, the system 401 may receive breathalyzer data input 403 from, for example, a BOOZINGA breathalyzer device, which may include computer code (e.g., C++) or other data. The system 401 may also include a plurality of modules, which may include one or more breathalyzer data receiving modules 402, contact list alert modules 404, response receiving modules 406, and/or notification modules 408. In one embodiment, output may be generated and output for use in block 407. It is noted that while the above-mentioned system and modules are illustratively provided, it is contemplated that other sorts of systems and modules may also be employed according to the present principles.

Having described preferred embodiments of a system and method for reducing latency time with cloud services (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

What is claimed is:

1. A method for testing blood alcohol level and transmitting results using a personal portable mobile device, comprising:
   attaching a breathalyzer device to the mobile device, the breathalyzer device being configured to transmit data to the mobile device;
   testing a blood alcohol level of a user using the breathalyzer device, the testing further comprising employing a verification mechanism to verify an identity of the user throughout the testing;
   sending an alert to one or more pre-determined contacts if the blood alcohol level of the user is above a pre-determined level;
   receiving a response from one or more pre-determined contacts indicating that a responding pre-determined contact is able to assist the user;
   notifying all non-responding pre-determined contacts that the responding pre-determined contact will assist the user; and
   notifying all non-responding pre-determined contacts when the responding pre-determined contact has arrived to assist the user.

2. The method as recited in claim 1, wherein the one or more pre-determined contacts, their availability, and distance to the user are displayed on the screen of the mobile device.

3. The method as recited in claim 1, wherein the pre-determined level is a local legal driving limit.

4. The method as recited in claim 1, wherein the verification mechanism is a front-facing camera on the mobile device configured to transmit a video of the user of the breathalyzer device to the one or more pre-determined contacts throughout the testing.

5. The method as recited in claim 1, wherein the one or more pre-determined contacts are selected from a social media contact list.

6. The method as recited in claim 1, wherein the user may send a request for assistance to one or more of the one or more pre-determined contacts for any of a plurality of reasons.

7. A system for testing blood alcohol level and transmitting results using a personal portable mobile device, comprising:
   a breathalyzer device attached to the mobile device, the breathalyzer device being configured to test a blood alcohol level of a user, and to transmit data to the mobile device, wherein a verification mechanism verifies an identity of the user throughout use of the breathalyzer device;
   an alert module configured to send an alert to one or more pre-determined contacts if the blood alcohol level of the user is above a pre-determined level;
   a response receiving module configured to receive a response from one or more pre-determined contacts indicating that the responding pre-determined contact is able to assist the user; and
   a notification module configured to notify all non-responding pre-determined contacts that the responding pre-determined contact will assist the user, and when the responding pre-determined contact has arrived to assist the user.

8. The system as recited in claim 7, wherein the one or more pre-determined contacts, their availability, and distance to the user are displayed on the screen of the mobile device.

9. The system as recited in claim 7, wherein the pre-determined level is a local legal driving limit.

10. The system as recited in claim 7, wherein the verification mechanism is a front-facing camera on the mobile device configured to transmit a video of the user of the breathalyzer device to the one or more pre-determined contacts throughout the testing.

11. The system as recited in claim 7, wherein the one or more pre-determined contacts are selected from a social media contact list.

12. The system as recited in claim 7, wherein the user may send a request for assistance to one or more of the one or more pre-determined contacts for any of a plurality of reasons.

13. A method for testing blood alcohol level and transmitting results using a personal portable mobile device, comprising:
   attaching a breathalyzer device to the mobile device, the breathalyzer device being configured to transmit data to the mobile device;
   testing a blood alcohol level of a user using the breathalyzer device, the testing further comprising employing a verification mechanism to verify an identity of the user throughout the testing, wherein the verification mechanism is a front-facing camera on the mobile device configured to transmit a video of the user of the breathalyzer device to one or more pre-determined contacts throughout the testing;
   sending an alert to the one or more pre-determined contacts if the blood alcohol level of the user is above a pre-determined level;

receiving a response from one or more pre-determined contacts indicating that a responding pre-determined contact is able to assist the user;

notifying all non-responding pre-determined contacts that the responding pre-determined contact will assist the user; and notifying all non-responding pre-determined contacts when the responding pre-determined contact has arrived to assist the user.

14. The method as recited in claim 13, wherein the one or more pre-determined contacts, their availability, and distance to the user are displayed on the screen of the mobile device.

15. The method as recited in claim 14, wherein the one or more pre-determined contacts are selected from a social media contact list.

16. The method as recited in claim 14, wherein the alert is a video alert.

* * * * *